(12) United States Patent
Jönsson (10) Patent No.: US 8,045,682 B2
(45) Date of Patent: Oct. 25, 2011

(54) STREAM CURRENT SONG

(75) Inventor: Mårten Jönsson, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1172 days.

(21) Appl. No.: 11/427,841

(22) Filed: Jun. 30, 2006

(65) Prior Publication Data

US 2008/0022315 A1    Jan. 24, 2008

(51) Int. Cl.
*H04M 11/00* (2006.01)
*H04M 3/42* (2006.01)

(52) U.S. Cl. ................ 379/88.13; 455/414.1

(58) Field of Classification Search .......... 455/414.1; 379/88.13
See application file for complete search history.

(56) References Cited

U.S. PATENT DOCUMENTS

| | | | | |
|---|---|---|---|---|
| 7,233,787 B2* | 6/2007 | Higuchi et al. | ............ | 455/414.1 |
| 2005/0227674 A1* | 10/2005 | Kopra et al. | ............ | 455/414.1 |
| 2006/0025116 A1* | 2/2006 | Silverbrook et al. | ...... | 455/414.1 |
| 2007/0010195 A1* | 1/2007 | Brown et al. | ............ | 455/3.06 |
| 2007/0058674 A1* | 3/2007 | Bucher et al. | ............ | 370/468 |
| 2007/0207782 A1* | 9/2007 | Tran | ............ | 455/414.1 |
| 2007/0264982 A1* | 11/2007 | Nguyen et al. | ............ | 455/414.1 |
| 2008/0176540 A1* | 7/2008 | Khedouri et al. | ............ | 455/414.1 |

FOREIGN PATENT DOCUMENTS

WO    02/093400    11/2002

OTHER PUBLICATIONS

Dobele, et al., "Controlled infection! Spreading the brand message through viral marketing", Business Horizons, JAI, vol. 48, No. 2, Mar. 2005, pp. 143-149.
No Author Named, A method for personalised notification of a broadcast media item—"You must hear this", IP. COM Journal, IP.COM. Inc., West Henrietta, NY, May 17, 2004.
Espinoza, et al., "Generic Peer-to-Peer Support for a Personal Service Platform", Applications and the Internet, 2003. Proceedings, IEEE, Jan. 2003, pp. 218-225.
Timmerer, et al., "Digital Item Adapation: Overview of Standardization and Research Activities", IEEE Transactions on Multimedia, IEEE Service Center, vol. 7, No. 3, Jun. 2005, pp. 418-426.
Written Opinion for International Application No. PCT/IB2006/003756 dated Apr. 13, 2007.
International Preliminary Report on Patentability for International Application No. PCT/IB2006/003756 dated Sep. 16, 2008.

* cited by examiner

*Primary Examiner* — Davetta W Goins
*Assistant Examiner* — Mohammad Islam
(74) *Attorney, Agent, or Firm* — Renner, Otto, Boisselle & Sklar, LLP (57) ABSTRACT

An electronic equipment includes a monitor circuit and a message generation circuit. The monitor circuit is operative to obtain information corresponding to media content reproduced by the electronic equipment, and the message generation circuit is operative to include the obtained information in an outgoing message.

18 Claims, 5 Drawing Sheets

STREAM CURRENT SONG

TECHNICAL FIELD OF THE INVENTION

The present invention relates generally to electronic equipment and, more particularly, to electronic equipment that promotes media content to users of such electronic equipment.

DESCRIPTION OF THE RELATED ART

Traditionally, media content, such as audio (e.g., music and/or spoken words) and video (e.g., moving images, movies, etc., with or without audio) have been distributed via conventional mediums such as audio and video tape, records, compact discs (CDs), Digital Versatile Disks (DVDs), or the like. While such mediums have satisfactorily served their purpose, they have some draw backs. For example, in order to listen to or watch the media content, an individual must first obtain the medium that contains the media content. This typically involves traveling to a retail store to purchase the medium with the media content, or, if purchased via mail order, waiting for the medium to be delivered to the individual's mailing address. Additionally, since the mediums are physical objects, they can become damaged (e.g., from handling and/or repeated use) such that the media content stored thereon cannot be reproduced.

As high-speed internet connections have become accessible to the general public, the distribution of media content in electronic form (e.g., as a file using any one of a number of different file formats, such as mp3, mpeg, divx, etc.) over the internet has become feasible. Apple Corporations iTunes™ and Sony Corporation's Connect™ are two examples of online services that facilitate the purchase and transfer of media content, such as music. Via such services, an individual may purchase media content from the convenience of his or her home, office, etc., without the need to set foot in a store or wait for the media to be delivered by mail. Moreover, media content producers need not manufacture, store and distribute a physical medium that contains the media content, thereby reducing costs. Additionally, since the electronic files are not physical objects, they cannot be damaged from handling or repeated use.

One drawback to distributing media content electronically is that not everyone is "internet savvy". That is, there are many individuals who are intimidated by purchasing goods and/or services over an electronic connection, such as the internet, or they simply do not possess the technical know how to purchases goods and services electronically. As a result, a segment of potential purchasers are effectively excluded, which can translate into lost or reduced sales of the media content (and thus lost revenues).

Additionally, individuals may have limited exposure to certain types of media content or to media content in general (e.g., their work schedules may limit or prevent exposure to media content). As a result, such individuals may not be exposed to some media content that they would otherwise enjoy and possibly purchase had they been exposed to the media content. Again, a segment of potential purchasers are excluded, resulting in lost revenues.

SUMMARY

The present invention enables electronic equipment, such as a mobile phone or the like, to include with a message, such as a text message, voice message, email message, instant message, or the like, information relating to media content that a message creator is listening to and/or viewing as the message is being composed. When the message is received by a recipient, the recipient's mobile phone displays a message regarding the media content, and can automatically stream the media content to the recipient's mobile phone. Further, the recipient may be prompted to purchase the media content, and may be guided through the purchasing process.

According to one aspect of the invention, there is provided an electronic equipment that includes a monitor circuit operative to obtain information corresponding to media content reproduced by the electronic equipment, and a message generation circuit operative to include the obtained information in an outgoing message.

According to another aspect of the invention, the information includes at least one of a name of the media content or a streaming source for the media content.

According to another aspect of the invention, the electronic equipment includes a decode circuit operative to decode an incoming message to obtain at least one of a name of the media content or a streaming source for the media content.

According to another aspect of the invention, the electronic equipment includes a control circuit operative to display a message on a display device indicative of the name of the media content.

According to another aspect of the invention, the control circuit is operative to connect to the streaming source so as to stream the media content to the electronic equipment.

According to another aspect of the invention, the message is a text message, a voice message, an email message or an instant message.

According to another aspect of the invention, the message is transmitted via short message service or multimedia message service.

According to another aspect of the invention, the media content is at least one of an audio program or a video program.

According to another aspect of the invention, there is provided a method for using electronic equipment to promote media content, comprising: including information in a message, the information corresponding to media content reproduced on a first electronic equipment; transmitting the message to a second electronic equipment; decoding the message on the second electronic equipment; and presenting the decoded information on the second electronic equipment.

According to another aspect of the invention, presenting includes displaying a name of the media content on the second electronic equipment.

According to another aspect of the invention, presenting includes streaming the media content to the second electronic equipment.

According to another aspect of the invention, the message is a text message, a voice message, an email message or an instant message.

According to another aspect of the invention, transmitting includes using short message service or multimedia message service to transmit the message.

According to another aspect of the invention, the media content is at least one of an audio program or a video program.

According to another aspect of the invention, including information includes adding at least one of a name of the media content or a streaming source for the media content to the message.

According to another aspect of the invention, decoding includes determining at least one of the name of the media content or the streaming source for the media content.

According to another aspect of the invention, there is provided a computer program operable in electronic equipment, said electronic equipment used to promote media content, comprising: code that includes information in a message, the information corresponding to media content reproduced on a first electronic equipment; and code that transmits the message to a second electronic equipment.

According to another aspect of the invention, the computer program includes code that decodes the message on the second electronic equipment; and code that presents the decoded information on the second electronic equipment.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

The present invention will now be described with reference to the drawings, wherein like reference numerals are used to refer to like elements throughout.

The term "electronic equipment" includes portable radio communication equipment. The term "portable radio communication equipment," which herein after is referred to as a "mobile radio terminal," "mobile phone," "mobile device," or "mobile terminal", and the like, includes all equipment such as mobile telephones, pagers, communicators, i.e., electronic organizers, personal digital assistants (PDAs), smartphones, portable communication apparatus or the like. The term "electronic equipment" also may include portable digital music and/or video devices, e.g., iPod devices, mp3 players, portable game systems, etc.

In the present application, the invention is described primarily in the context of a mobile phone. However, it will be appreciated that the invention is not intended to be limited to a mobile phone and can be any type of electronic equipment.

Figure 1:
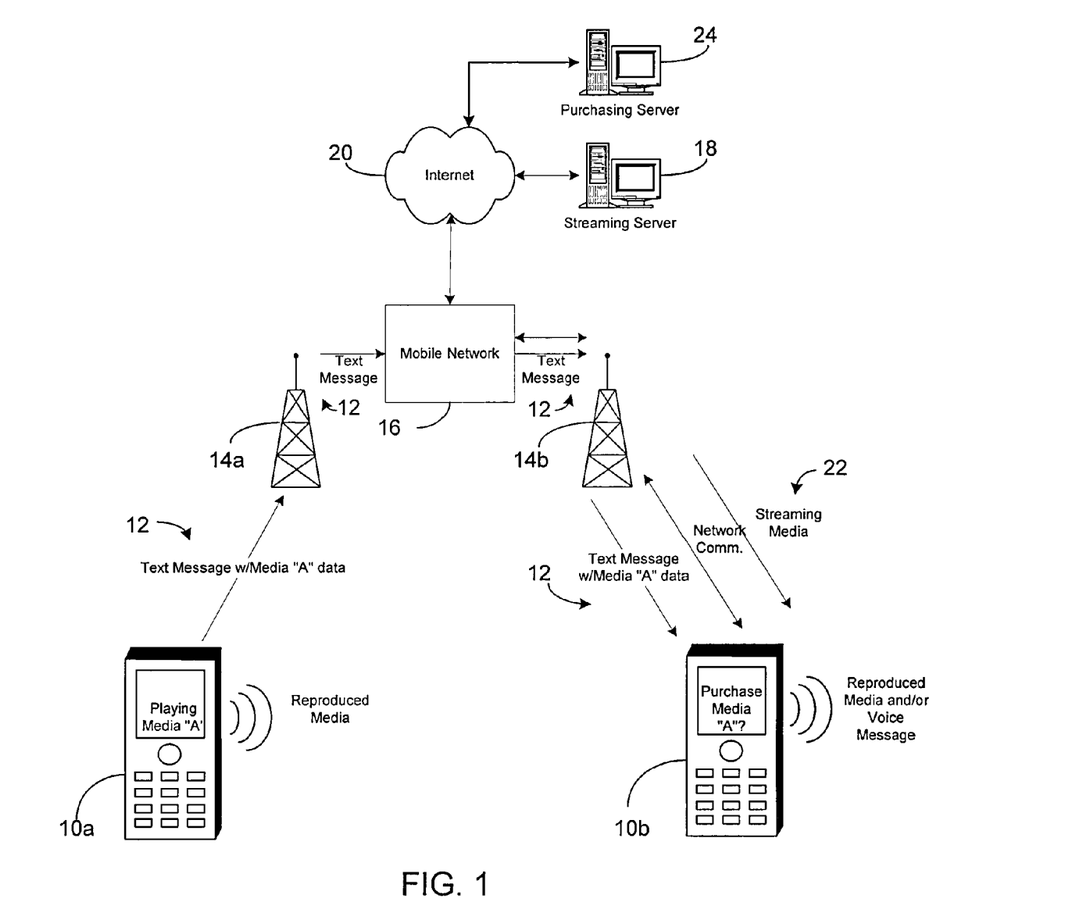
FIG. 1 illustrates an exemplary application of a mobile phone in accordance with the present invention.

Referring initially to FIG. 1, there is shown first and second electronic equipment 10a and 10b, such as mobile phones 10a and 10b, wherein a message 12 is being transmitted from the first mobile phone 10a to the second mobile phone 10b. The message 12 may be a text message, voice message, instant message, email message, or the like. The message may be transmitted from the first mobile phone 10a to a tower 14a so as to obtain access to a mobile phone network 16, and then from the mobile phone network to the second mobile phone 10b via tower 14b, as is conventional.

As the message 12 is composed on the first mobile phone 10a, the mobile phone 10a may be reproducing media content (e.g., audio and/or video recordings). The mobile phone 10a, prior to transmitting the composed message 12, includes information corresponding to the reproduced media content in the message 12. The included information may be in the form of a footer or header that is appended to the message 12, for example, or it may be embedded within the message itself. The information can include, for example, a name, artist, album title, movie title, streaming source of the reproduced media content, etc., as well as a general message.

For example, if the first mobile phone 10a is reproducing a song entitled "A", prior to transmitting the message 12 the first mobile phone 10a automatically generates the additional message "The sender is currently listening to A", and includes this message with the composed message (e.g., as a footer of the composed message). Additionally, the mobile phone 10a may include a source where song A may be streamed to the second mobile phone 10b so as to enable the recipient to listen to the song.

The message 12 then is transmitted from the first mobile phone 10a to the second mobile phone 10b via towers 14a and 14b and mobile phone network 16 as is conventional. When the message 12 is opened on the second mobile phone 10b, the composed message, for example, is displayed along with a footer containing the message "The sender is currently listening to A". Additionally, the second mobile phone 10b, using the streaming source included in the message, accesses a streaming server 18 via the tower 12b, mobile network 16 and internet 20. Song A then is streamed 22 to the mobile phone 10b, thereby enabling song A to be reproduced on the mobile phone 10b. Once song "A" has completed (or within a predetermined time), a message may be displayed on the mobile phone 10b inquiring whether the recipient wishes to purchase song A. If the recipient wishes to purchase song A, the mobile phone 10b may be redirected to a purchasing server 24, and payment for the song may be made using conventional electronic payment methods. Once payment has been made, song A then may be transferred to the second mobile phone 10b and stored in memory. While the streaming and purchasing servers are shown as separate devices, it will be appreciated that the streaming server and the purchasing server may be integrated on a single server.

With respect to voice messages, the message, in addition to the composer's message, can include an introduction or closing formed from computer generated speech, pre-recorded speech of the composer, or a combination of both, that indicates the media content being reproduced on the first mobile phone 10a. As will be appreciated, the media content may be automatically muted as the user records the voice mail message so as to not create an unintelligible message.

Figure 2:
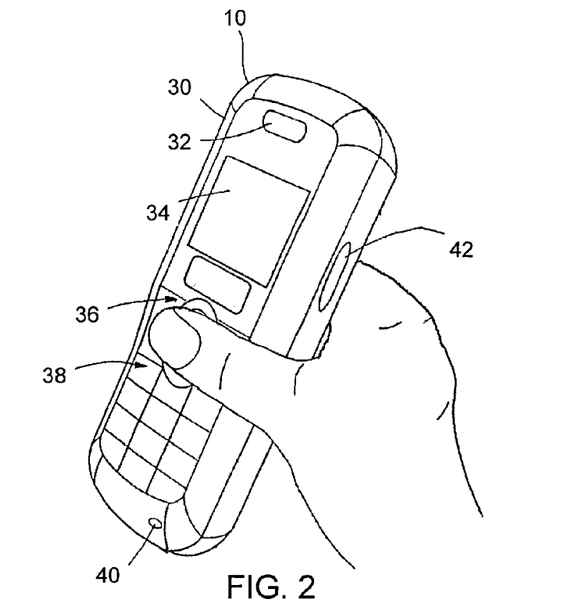
FIG. 2 is schematic illustration of an exemplary mobile phone.
Figure 3:
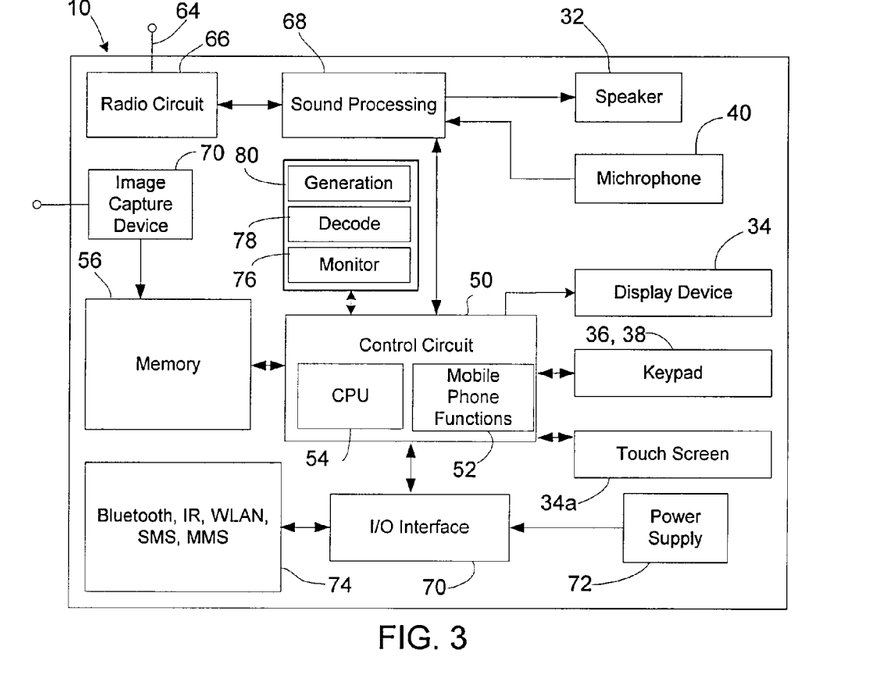
FIG. 3 is a schematic block diagram of a number of exemplary relevant portions of the respective mobile phone of FIG. 2 in accordance with the present invention.

Referring now to FIG. 2, a mobile phone 10 is shown as having a "brick" or "block" design type housing 30, but it will be appreciated that other type housings, such as, for example, claim shell or slide-type housings, may be utilized without departing from the scope of the invention. The mobile phone 10 includes housing 30 (sometimes referred to as a case), speaker 32, display 34, navigation switch and selection/function keys or switches 36, key pad 38, microphone 40, and volume control slide switch 42; these are illustrative and exemplary of parts of a typical mobile phone, but it will be appreciated that other parts that are similar or different in form and/or function may be included in the mobile phone 10. The mobile phones to which the invention pertains also may be of the types that have more or fewer functions, keys, etc., compared to those illustrated and described herein.

As will be appreciated, the mobile phone 10 may function as a conventional mobile phone. The mobile phone 10 may have additional functions and capabilities that may be developed in the future. From a conventional point of view, the display 34 displays information to a user, such as operating state, time, phone numbers, contact information, various navigational menus, etc., which facilitate and/or enable the user to utilize the various features of the mobile phone. Part or all of the display 34 may be a touch screen type device 34a (FIG. 3). The navigation and function keys 36 and the keypad 38 may be conventional in that they provide for a variety of user operations. For example, one or more of the function keys and navigation device 36 may be used to navigate through a menu displayed on the display 34 to select different phone functions, profiles, settings, etc., as is conventional. The keypad 38 typically includes one or more special function keys, such as, a "call send" key for initiating or answering a call, a "call end" key for ending or hanging up a call, and dialing keys for dialing a telephone number. Other keys included in the navigation and function keys 36 and/or keypad 38 may include an on/off power key, a web browser launch key, a camera key, a voice mail key, a calendar key, etc. The volume control switch 42 may be operated to increase or to decrease the volume of the sound output from the speaker 32. If desired, a sensitivity control also may be provided to change the sensitivity of the microphone 40 as it picks up sounds for transmission by the mobile phone 10. The mobile phone 10 may have more of fewer keys, navigation devices, etc., compared to those illustrated.

FIG. 3 represents a functional block diagram of an exemplary mobile phone, for example, the mobile phone 10. The representation also is similar to those of PDAs and/or other electronic equipment, as will be appreciated by those having ordinary skill in the art. The construction of the mobile phone 10, which is presented by way of example here, is generally conventional with the exception of the messaging capabilities as described in greater detail below. The various functions carried out by the parts represented in the functional block diagram of FIG. 3 may be carried out by application software within the mobile phone 10. However, it will be apparent to those having ordinary skill in the art that such operation can be carried out via primarily software, hardware, firmware, or a combination thereof, without departing from the scope of the invention.

The mobile phone 10 includes a primary control circuit 50 that is configured to carry out overall control of the functions and operations of the mobile phone 10, e.g., as is represented at block 52. The control circuit 50 may include a CPU 54 (central processor unit), microcontroller, microprocessor, etc., collectively referred to herein simply as CPU 54. The CPU 54 executes code stored in memory within the control circuit 50 and/or in a separate memory 56 in order to carry out conventional operation of the mobile phone functions within the mobile phone 10.

Continuing to refer to FIG. 3, the mobile phone 10 includes a conventional antenna 64, radio circuit 66, and sound processing signal circuit 68, all of which are cooperative to send and to receive radio frequency (or other) signals in conventional manner. For an incoming signal, for example, the sound processing signal circuit 68 may include an amplifier to amplify the signal and to provide it to the speaker 32 so a user may hear the sound, and the sound processing signal circuit 68 also may use the same amplifier or another amplifier to amplify signals from the microphone 40 for transmitting thereof via the radio circuit 66 and antenna 64 to another mobile telephone, to a cellular phone tower, to a satellite, etc. Operation of the radio circuit 52, sound processing signal circuit 54, speaker and microphone, are under control of the control circuit 50, as is conventional.

The mobile phone 10 includes the display device 34, keypad 36, 38 (including the navigation device mentioned above), and the capability of a touch screen 34a, which may be part or all of the display device 34, and these are coupled to the control circuit 50 for operation as is conventional.

As is illustrated in FIG. 3, the mobile phone 10 includes an input/output interface 70, a power supply 72, and a short distance communications mechanism 74, for example a Bluetooth communications device, infrared (IR) communications device, or some other device. Another example of a short distance communications mechanism is wireless local area network (WLAN), and the invention also may use still other short distance communications mechanisms or devices that currently exist or may be developed in the future. The short distance communications mechanism 74 may transmit and receive signals using SMS (short message service), MMS (multimedia messaging service) or some other communications mechanism and protocol. Bluetooth, IR, WLAN communications for communicating over short distances between mobile phones are well known; other mechanisms may exist and/or may be developed in the future, and these may be utilized by and are included for use in the invention.

The mobile phone 10 also includes an image capture device 76, such as a camera or the like. The image capture device 76 is used to capture and/or store image data in the mobile phone 10, wherein the image data may be stored in any one of a number of conventional formats (e.g., bitmap or bmp, jpeg, gif, tiff, or any other format for storing image data). As will be appreciated, activation of image capture may be enabled via a function key, soft menu, or any other form for enabling and disabling features of electronic equipment.

The mobile phone 10 also includes a monitor circuit 76, decode circuit 78 and message generation circuit 80. As will be described below, these circuits enable the mobile phone 10 to create and decode messages 12 relating to media content being reproduced on the mobile phone 10.

The monitor circuit 76 monitors media content reproduced by the mobile phone 10. For example, if the mobile phone 10 is reproducing a song (e.g., an mp3 audio file), the monitor circuit 76 determines the name, artist, album title, or the like, of the song and a location from which it may be streamed. This information may be previously stored as tags that are associated with the song file, for example. The monitor circuit 76 then need only determine the file name of the song by requesting such information from the control circuit 50, for example. The control circuit 50 then may provide the file name of the song, as well as the associated information, or it simply may provide the file name and the monitor circuit 76 can obtain the information from the tags. The retrieved information may be stored in memory 56 for later use.

The message generation circuit 80 creates the message (referred to as the media message) that is included with the composed text, instant, email, and/or voice mail messages. The media message, for example, may be formed from the media content name, artist and/or album title (as obtained by the monitor circuit 76 and stored in memory 56, e.g., the title "A") appended to a standard message (e.g., "The sender is listening to"). Additionally, the message generation circuit 80 also may include in the media message a streaming source for the media content (e.g., a URL address for a streaming server 16). The streaming source also enables the receiving mobile phone to access the streaming server 18 and stream the media content, which ten is output via the speaker 32 and/or display 34. The format of the message 12 is described in further detail with respect to FIGS. 4A and 4B.

The decode circuit 78 operates to analyze the incoming message 12 and extract non-displayed data from the message (e.g., data related to streaming of the media content). For example, if the incoming message includes only text data, then the decode circuit 78 is idle as there is no information to extract from the message. However, if the incoming message 12 includes a streaming source for the media content, the decode circuit 78 extracts this information from the message 12. The decode circuit 78 then provides the extracted data along with the textual data to the control circuit 50 for further processing, such as displaying the text data and accessing the streaming server 18 so as to stream the media content to the mobile phone 10. Examples of information that may be extracted by the decode circuit 78 include a URL of the aforementioned streaming source, a URL for a purchasing server, a URL for a website promoting the media content (e.g., an artist web site, a movie web site), or any other non-textual information.

While the monitor, decode and generation circuits 76, 78 and 80 are shown as individual circuits separate from the control circuit 50, it will be appreciated that such circuits may be implemented as part of the control circuit 50 (e.g., in hardware or software).

Figures 4A, 4B:
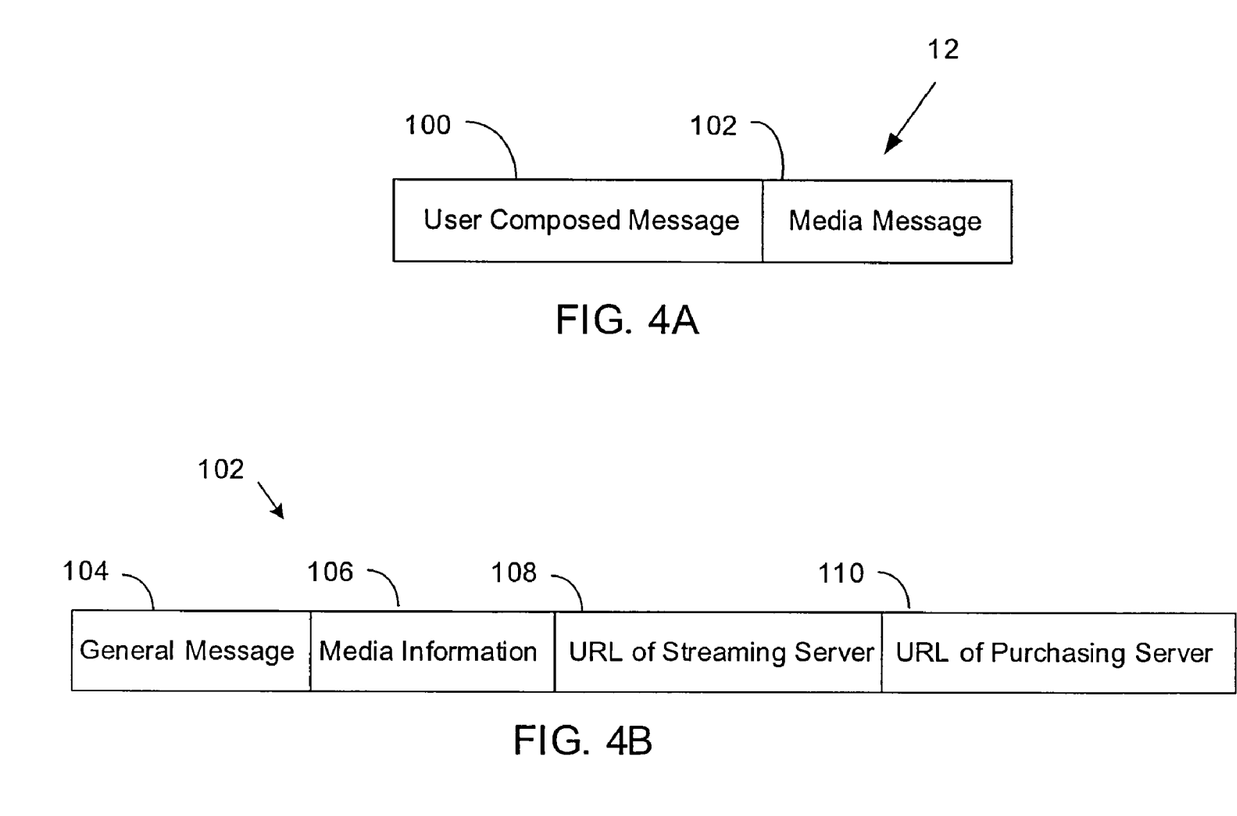
FIG. 4A is a schematic diagram of an exemplary message including a user composed message and an additional message in accordance with the invention.
FIG. 4B is a schematic diagram of the additional message within the message of FIG. 4A.

Moving now to FIG. 4A, there is shown an exemplary message 12, wherein the message includes a user composed message 100. The user composed message 100 is the portion of the message 12 created by the user. For example, if the user is sending the message "Meet me at the dealership", this would form the user composed message 100 of the message 12. In addition to the user composed message 100, there is also included an additional portion 102 (also referred to as the media message 102), which may be in the form of a footer or header, for example. The media message 102 includes information related to media content being played on the composer's mobile phone 10, such as the media content name, artist information, streaming source, etc. As will be appreciated, media message 102 of the message 12 may be embedded within the user composed message 100 of the message 12 (e.g., intermixed with or an integral part of the user composed message). This intermixed message then may be decoded by the decode circuit 78 of the recipient's phone.

With further reference to FIG. 4B, there is shown in more detail the media message 102 of the message 12. The media message 102 can include a general message 104, which may a standardized or "canned" message depending on the media content type being reproduced on the sender's mobile phone. For example, if the sender is listening to music, the general message 104 may be "The sender is listening to", or "The streamed music was recorded by". Alternatively, if the sender is watching a movie, the general message 104 may be "The sender is watching".

Following the general message 104 is the media information 106. The media information 106 can be any information related to the media content played on the sender's mobile phone. Preferably, the media information 106 includes the name of the media content. The media information 106 also can include one or more of the artist information, album name, genre, year of release, etc.

The media message 102 also may include a streaming server URL 108 and/or a purchasing server URL 110. The URLs 108 and 110 are used to connect to a streaming server 18 (or purchasing server 24) to enable the media content to be streamed to the mobile phone 10 (or purchased by the recipient). Streaming of media content as well as on-line purchasing is well known and will not be described herein.

A person having ordinary skill in the art of computer programming and applications of programming for mobile phones would be able in view of the description provided herein to program a mobile phone 10 to operate and to carry out the functions described herein. Accordingly, details as to the specific programming code have been omitted for the sake of brevity. Also, while software in the memory 56 or in some other memory of the mobile phone 10 may be used to allow the mobile phone to carry out the functions and features described herein in accordance with the preferred embodiment of the invention, such functions and features also could be carried out via dedicated hardware, firmware, software, or combinations thereof, without departing from the scope of the invention.

Figure 5:
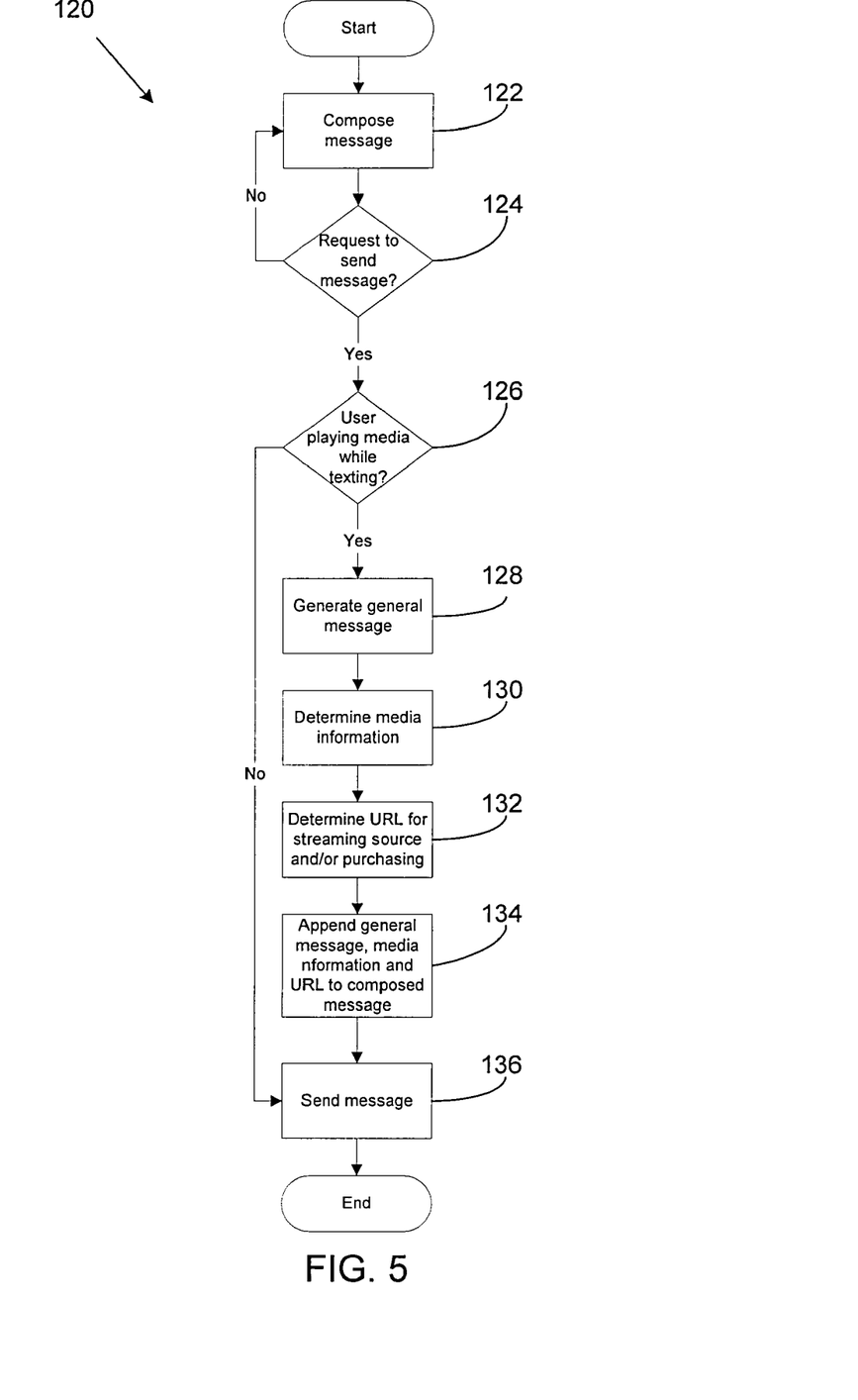
FIG. 5 is a flow chart illustrating exemplary steps for creating a message in accordance with the invention.
Figure 6:
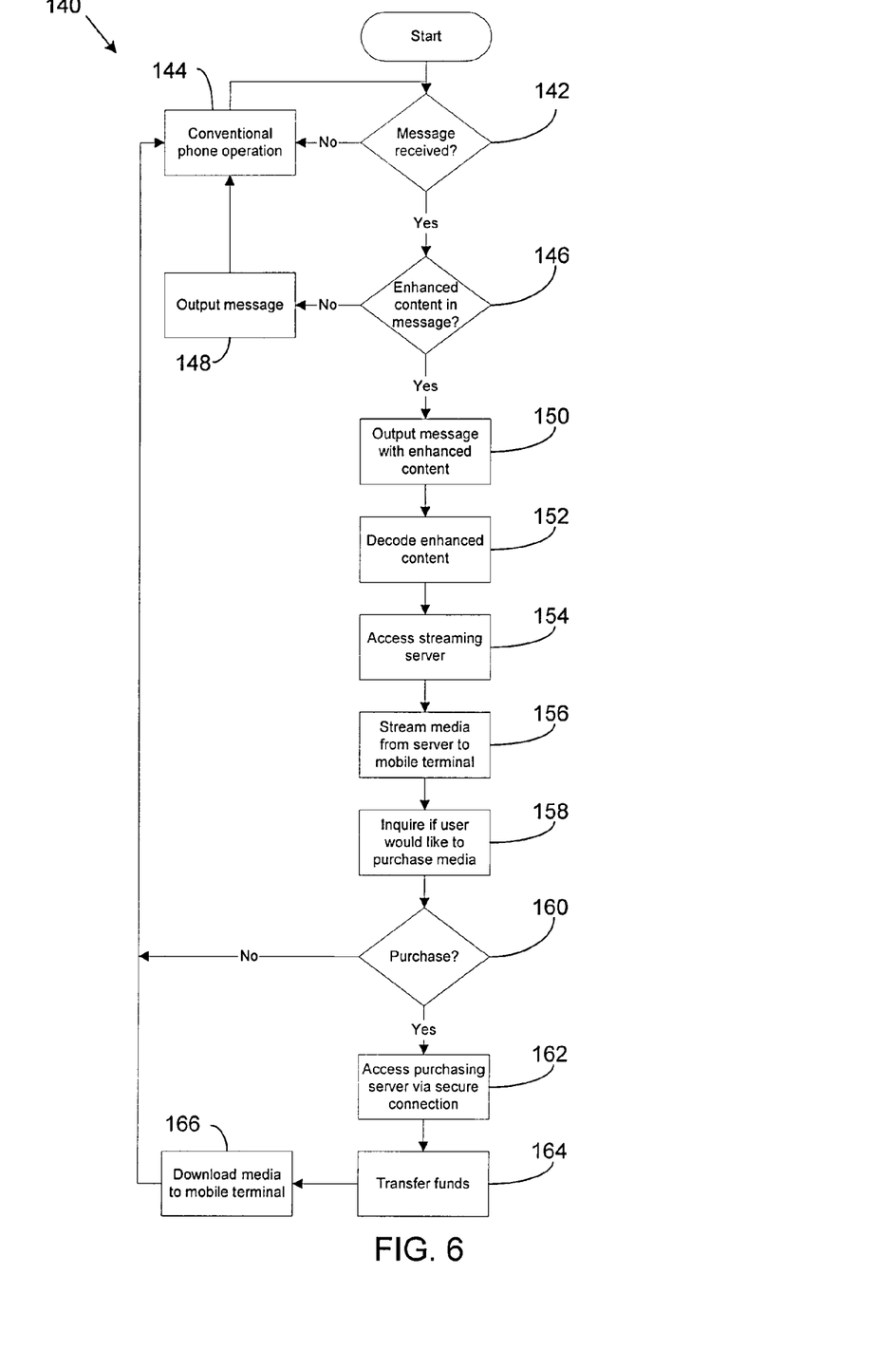
FIG. 6 is a flow chart illustrating exemplary steps for decoding the message so as to display and stream the media content in accordance with the invention.

FIGS. 5 and 6 illustrate representative flow charts 120 and 140 showing exemplary steps, functions and methods that may be carried out using the invention. The flow charts include a number of process blocks arranged in a particular order. As should be appreciated, many alternatives and equivalents to the illustrated steps may exist and such alternatives and equivalents are intended to fall within the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

The steps shown in the flow chart may be carried out using a mobile phone 10, for example, of the type described herein or other type. Appropriate programming code may be written in an appropriate computer language or the like to carry out the steps, functions and methods as now are described with respect to FIGS. 5 and 6. The steps shown in the flow chart are referred to below as blocks.

The flow chart 120 of FIG. 5 illustrates exemplary steps for creating the message 12. Beginning at block 122, a user of a first mobile phone 10a composes a message 100. The message 100 may be a text message, instant message, email message or voice message, and may be entered using the key pad 36 or microphone 40 as is conventional. At block 124, it is determined if the message 100 is complete and ready for sending. For example, when a text, instant or email message is complete and ready for transmission, the user generally presses a "send" key or the like. A voice message may be identified as complete when a pound (#) or star (*) key have been pressed, for example, or when the call is terminated (e.g., pressing the end key or otherwise hanging up the phone 10a).

If a request to send the message 12 has not been issued, then the method moves back to block 122. If the request to send the message 12 has been initiated, then at block 126 it is determined if the composer of the message is playing media on the phone (e.g., listening to music or watching a video). Determination of whether or not media content is being reproduced on the mobile phone is implemented via the monitor circuit 76. For example, the monitor circuit 76 may interrogate the control circuit 50 at predetermined time intervals to determine the activities executed within the phone 10. If the activities do not include reproducing media content, then the method moves to block 136 and the message is sent to the recipient. If, however, the activities include reproducing media content, then the method moves to block 128 to generate the media message 102 of the message 12.

At block 128, the general message 104 of the media message 102 is created. For example, the message generation circuit 80, depending on the type of media content being reproduced as determined by the monitor circuit 76, may use a standardized message that describes what is occurring on the mobile phone (e.g., the user is listening, watching, etc.). This general message 104 is stored in memory 56 and forms the first portion of the media message 102.

Next, at block 130 the media information 106 (e.g., name, artist, album, playing time, genre, etc., of the media content) are determined and stored in memory 56. For example, the monitor circuit 76 may request that the control circuit 50 provide specific details regarding the media content (e.g., name, artist, etc.). Alternatively, the monitor circuit 76 may use the reproduced media content file name (obtained from the control circuit 50) to obtain the media information 106 (e.g., by retrieving the name, artist, etc. from tags associated with the media content file name).

At block 132, one or more URLs related to the media content are determined and stored in memory. The URLs 108 and 110 may be determined, for example, from tags associated with the media content file name. The URLs may be related to a streaming server 18 for the media content or to a purchasing server 24 for the media content. As will be appreciated, other information also may be included in the message, such as the cost of the media content, for example.

At block 134, the media message 102 (e.g., the general message 104, media information 106, and URL's 108 and 110) is included with the user composed message 100 to form the message 12. For example, the media message 102 may be formatted as a footer and appended to the composed message 100. Alternatively, the media message 102 may be embedded in the user composed message 100 and later extracted by the decode circuit 78. Next, at block 136 the message is transmitted to the recipient using conventional transmission methods.

The flow chart 140 of FIG. 6 illustrates exemplary steps for receiving the message 12. Beginning at block 142, it is determined if a message 12 has been received by the second mobile phone 10b via conventional methods. If a message 12 has not been received, then the method moves to block 144 to address conventional phone operations (e.g., receiving calls, etc.) and then moves back to block 142. If a message has been received, then at block 146 it is determined if the message includes additional or enhanced content (e.g., a URL for streaming or purchasing music, or the additional content 102 embedded with the composed message 100). For example, the decode circuit 78 may analyze the message 12 to determine if there is a URL 108 for streaming media in the message 12, or if the message is encoded such that it requires decoding prior to output.

If additional or enhanced content is not found in the message 12, then the method moves to block 148 and provides the message to the recipient. For example, a text, instant or email message may be displayed on the screen along with the formatted header or footer that includes information corresponding to the media content reproduced on the sender's mobile phone 10a. If the message is a voice mail message, then, for example, as the voice message is replayed by the recipient, the voice message may include an introduction or closing that indicates that the sender was listing to a particular song.

If enhanced content is found within the message 12, then at blocks 150 and 152 the message 100 and media message 102 are decoded (if necessary) and/or output on the second mobile phone 10b (e.g., on the display 34). As noted above, decoding of the message is implemented by the decode circuit 78, and may include, for example, extracting the URL information from the message and/or decoding the message (assuming the media message 102 is embedded with the composed message 100). Next, at block 154 the second mobile phone 10b uses the URL within the message 12 to access the streaming server 18 and stream the media content to the second mobile phone 10b. Thus, the recipient can listen to and/or view the media content on the second mobile phone 10b. Accessing the streaming server 18 and receiving the streamed media content from the server 18 can be implemented using conventional techniques.

Next at block 158, the recipient is presented with the option of purchasing the streamed media content. If the recipient does not wish to purchase the media content, then the method moves back to block 144 to resume normal phone operations. However, if the recipient does wish to purchase the media content, then at block 162 the mobile phone 10b accesses the purchasing server 24 (via the URL 110 included in the message 12). The recipient then may be guided through the purchasing process (e.g., prompted to enter information, such as an account number, credit card number, or other means of payment and/or identification) and charged for the purchase. The recipient then may download the media content to the second mobile phone 10b and listen to and/or view the media content at any time.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electronic device, comprising:
   a monitor circuit configured to obtain information corresponding to media content, reproduced by the electronic device; and
   a message generation circuit configured to append to a user composed message the information corresponding to media content being reproduced by the electronic device, said information obtained while at least a portion of the user composed message is created, and said user composed message unrelated to the media content.

2. The electronic device of claim 1, wherein the information includes at least one of a name of the media content or a streaming source for the media content.

3. The electronic device of claim 1, further comprising a decode circuit operative to decode an incoming message to obtain at least one of a name of the media content or a streaming source for the media content.

4. The electronic device of claim 3, further comprising a display device and a control circuit, said control circuit operative to display a message on the display device indicative of the name of the media content.

5. The electronic device of claim 4, wherein the control circuit is operative to connect to the streaming source so as to stream the media content to the electronic device.

6. The electronic device of claim 1, wherein the message is a text message, a voice message, an email message or an instant message.

7. The electronic device of claim 1, wherein the message is transmitted via short message service or multimedia message service.

8. The electronic device of claim 1, wherein the media content is at least one of an audio program or a video program.

9. A method for using an electronic device to promote media content, comprising:
   including information in a user composed message, the information corresponding to media content reproduced on a first electronic device while at least a portion of the user composed message is being created via the first electronic device, said user composed message unrelated to the media content;
   transmitting the user composed message to a second electronic device;
   decoding the user composed message on the second electronic device to obtain the information corresponding to the media content; and
   presenting the information corresponding to the media content on the second electronic device.

10. The method of claim 9, wherein presenting includes displaying a name of the media content on the second electronic device.

11. The method of claim 9, wherein presenting includes streaming the media content to the second electronic device.

12. The method of claim 9, wherein the user composed message is a text message, a voice message, an email message or an instant message.

13. The method of claim 9, wherein transmitting includes using short message service or multimedia message service to transmit the message.

14. The method of claim 9, wherein the media content is at least one of an audio program or a video program.

15. The method of claim 9, wherein including information includes adding at least one of a name of the media content or a streaming source for the media content to the message.

16. The method of claim 9, wherein decoding includes determining at least one of the name of the media content or the streaming source for the media content.

17. A computer program embodied on a non-transitory computer readable medium and operable in an electronic device used to promote media content, comprising:
   code that includes information in a user composed message, the information corresponding to media content reproduced on a first electronic device while at least a portion of the user composed message is being created via the first electronic device, said user composed message unrelated to the media content; and
   code that transmits the user composed message to a second electronic device.

18. The computer program of claim 17, further comprising:
   code that decodes the user composed message on the second electronic device to obtain the information corresponding to the media content; and
   code that presents the information corresponding to the media content on the second electronic device.

* * * * *